Patented Feb. 16, 1926.

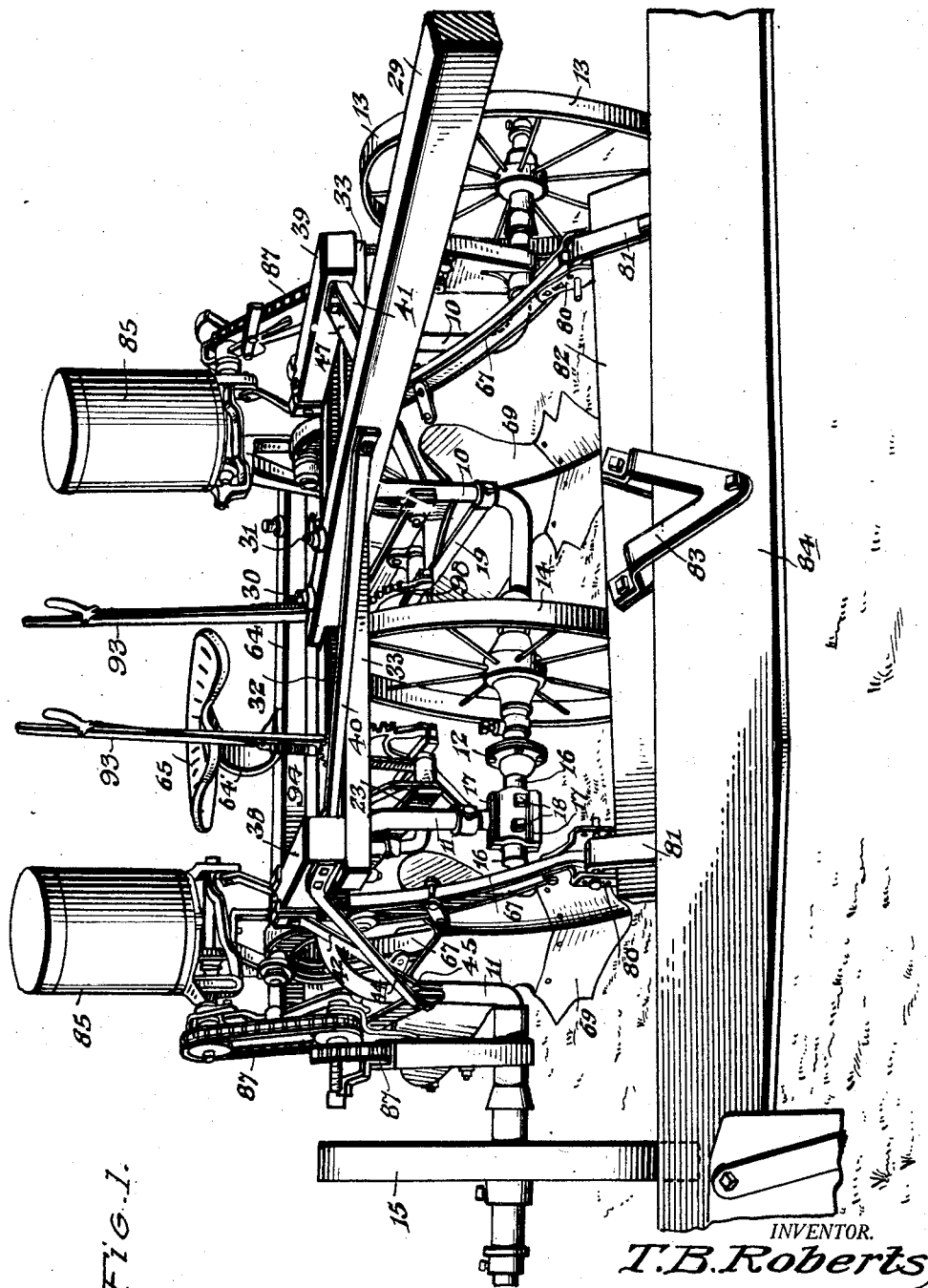

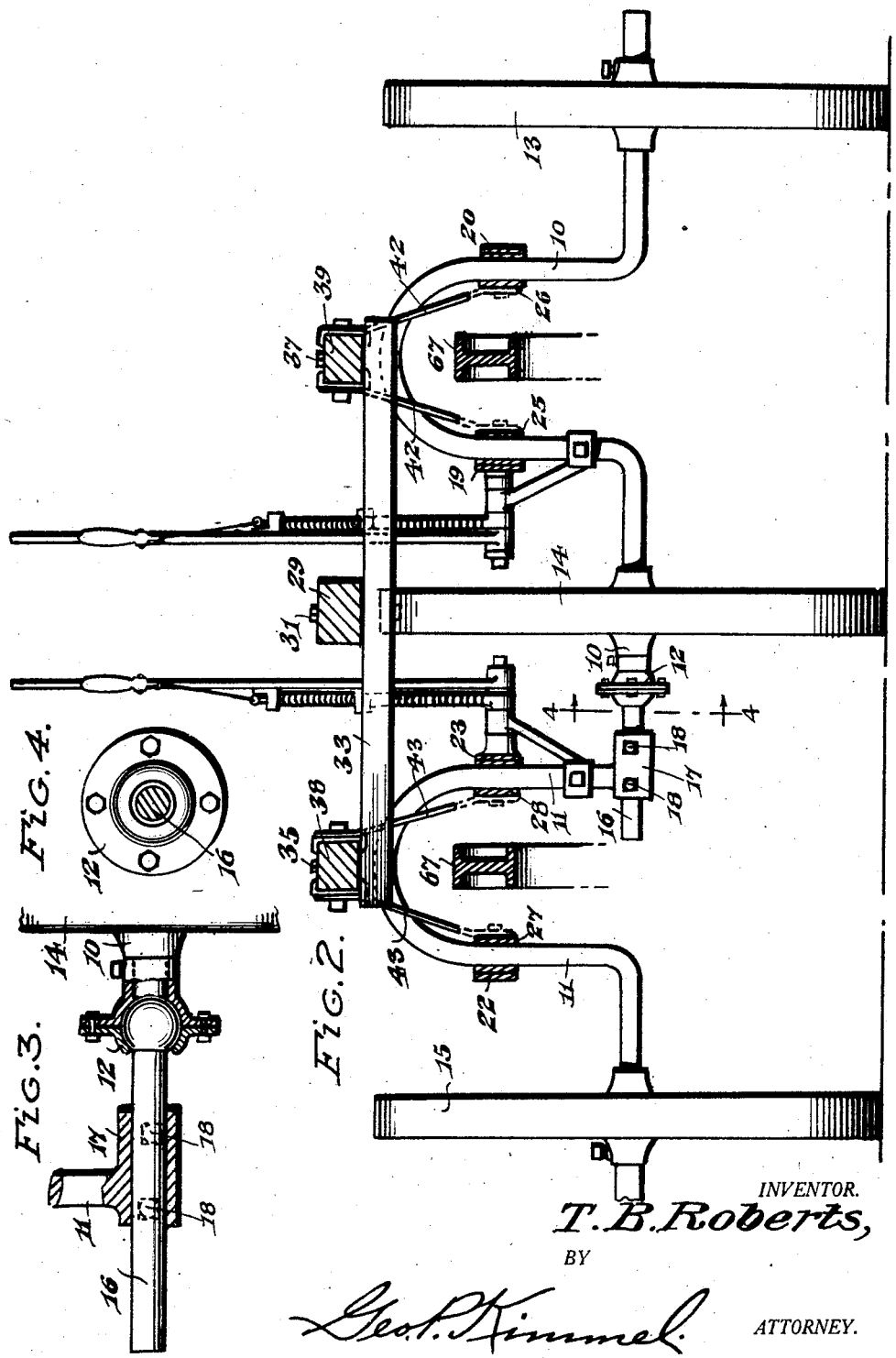

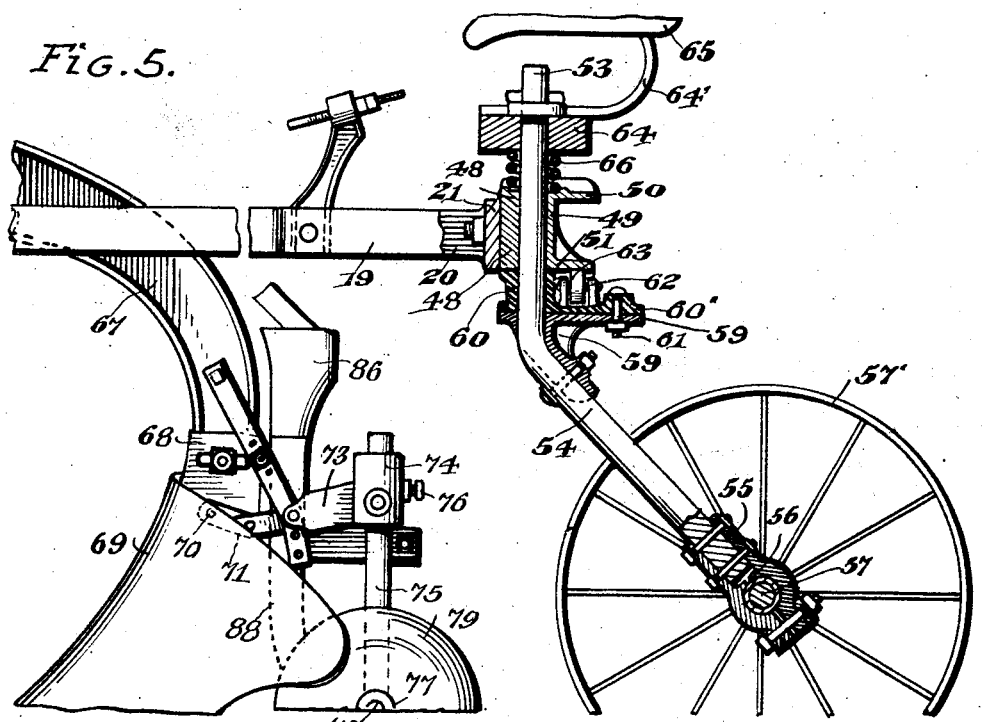
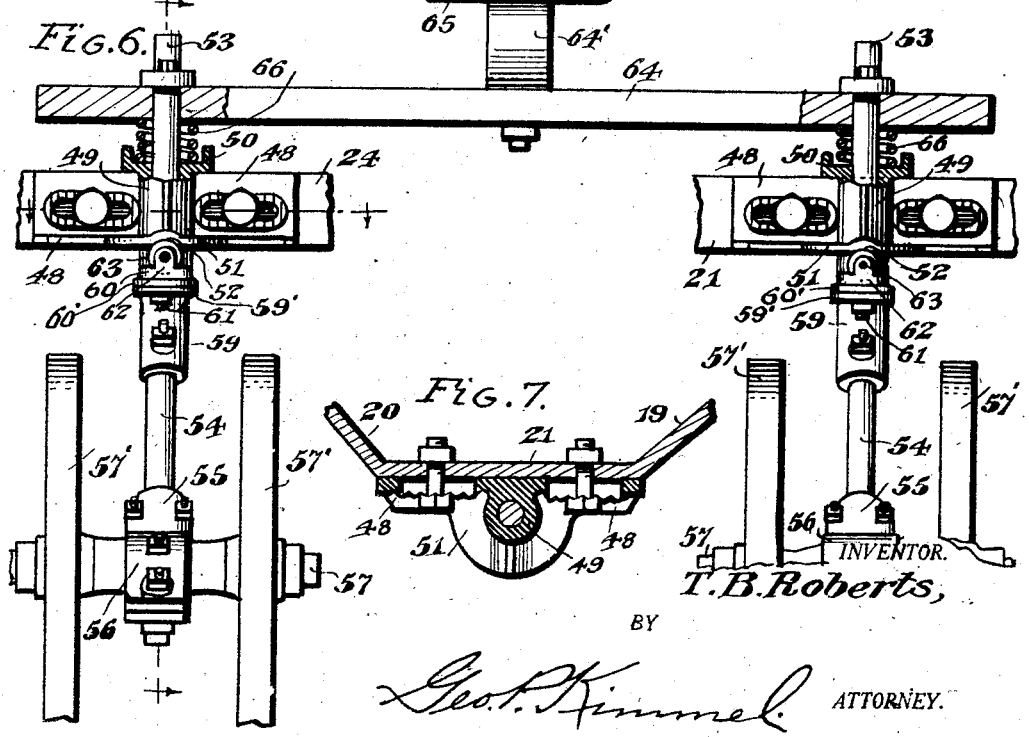

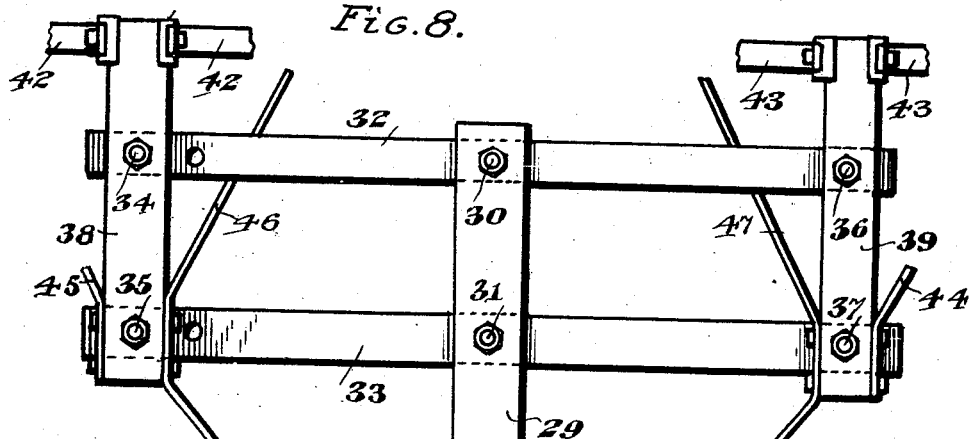
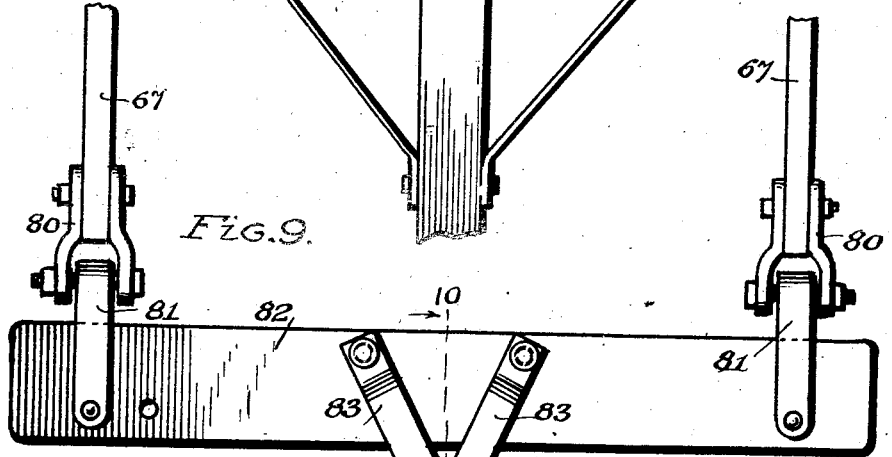
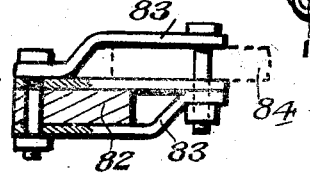

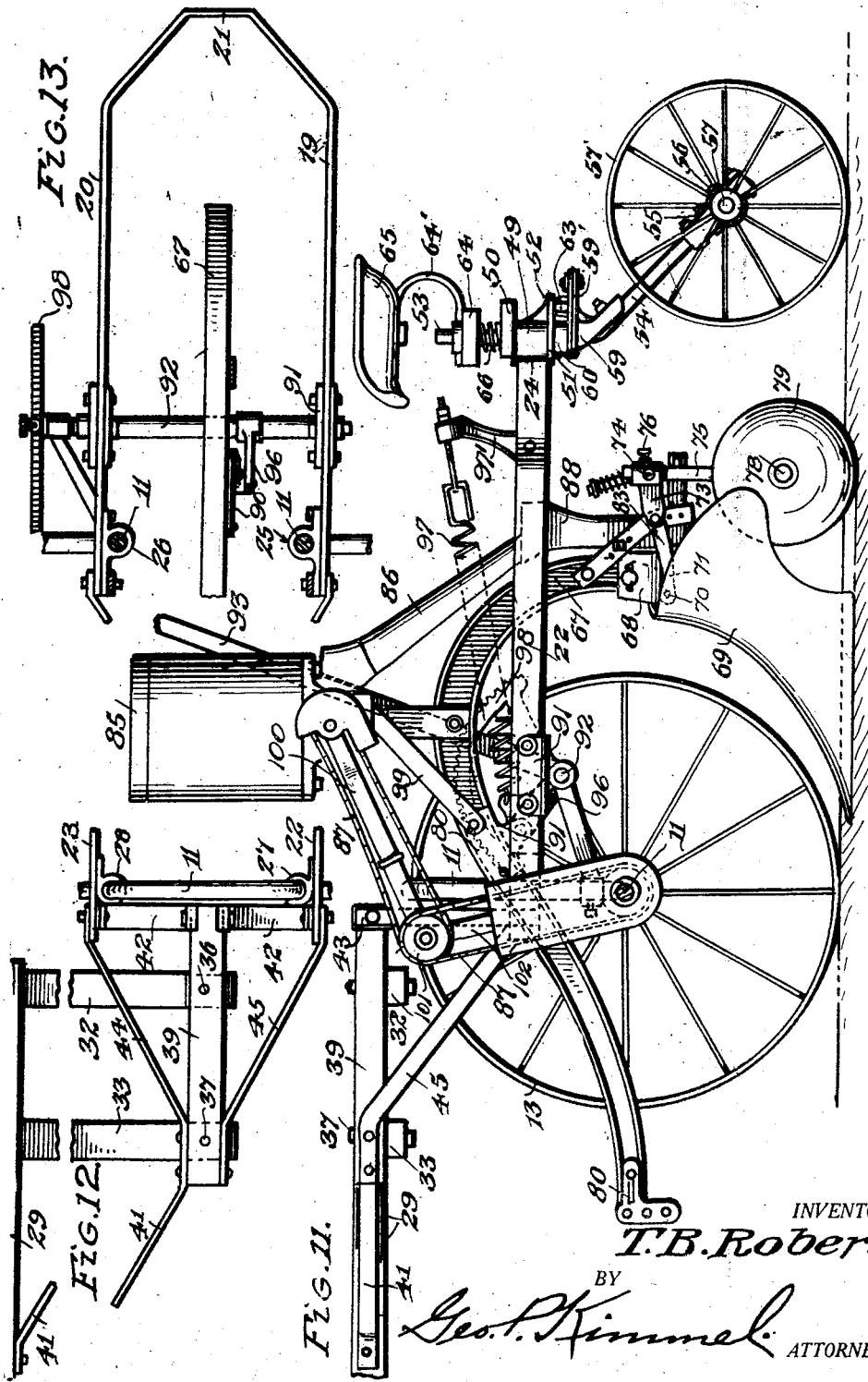

1,573,745

UNITED STATES PATENT OFFICE.

TURNEY B. ROBERTS, OF MEMPHIS, TEXAS.

LISTER PLOW.

Application filed December 8, 1924. Serial No. 754,596.

*To all whom it may concern:*

Be it known that I, TURNEY B. ROBERTS, a citizen of the United States, residing at Memphis, in the county of Hall and State of Texas, have invented certain new and useful Improvements in Lister Plows, of which the following is a specification.

This invention relates to plows, more particularly of the class of lister plows, and has for one of its objects to improve the construction and increase the efficiency and utility of devices of this character.

Another object of this invention is to provide a device of this character having means for coupling two or more plows to operate in unison, and with sufficient flexibility in the coupling to permit operation over uneven ground, and also with the parts so arranged that one of the plows may be operated singly.

With these and other objects in view, the invention consists in certain novel features of construction as hereinafter shown and described and then specifically pointed out in the claims, and in the drawings illustrative of the preferred embodiment of the invention.

Fig. 1 is a perspective view from the front of the improved apparatus.

Fig. 2 is a rear elevation of the flexible two-part axle and the carrier wheels, partly in section.

Figs. 3 and 4 are enlarged details of the universal joint between the two-part axle portions.

Fig. 5 is an enlarged side elevation, partly in section.

Fig. 6 is a rear elevation, partly in section, of the trailer wheels and their supporting mechanism.

Fig. 7 is a sectional detail of the swivel coupling of one of the trailer wheels.

Fig. 8 is a plan view, enlarged, of a portion of the draft tongue and its supports.

Fig. 9 is a plan view, enlarged, of the draft beam and its attachments.

Fig. 10 is a section on the line 10—10, of Fig. 9, looking in the direction of the arrow.

Fig. 11 is a side elevation with the right carrier wheel detached.

Fig. 12 is a plan view on a reduced scale illustrating the connection between the draft tongue and axle.

Fig. 13 is a plan view of one of the supporting frames and one of the axle sections, the axle being in transverse section.

The improved device includes a two-part arched axle 10 and 11 flexibly united by a universal joint, represented conventionally at 12. The axle section 10 carries spaced bearing wheels 13 and 14, while the axle section 11 carries a single wheel 15.

One side member of the universal joint 12 is coupled to the inner terminal of the axle 10, while the other side member is coupled to a stub axle 16, and the adjacent portion of the arched axle 11 terminates in a sleeve 17 slidable on the stub shaft and adapted to be adjustably coupled thereto, for instance by set screws 18. By this arrangement the axle section 11 and its attachments may be adjusted toward and away from the axle section 10 within the range of the stub axle to vary the distance between the lister plows, as hereafter explained.

Rigidly attached to the vertical portions of the arched axle 10 is a substantially U-shaped frame including spaced side portions 19—20 and lateral rear connecting portions 21, while a like U-shaped frame, including spaced side portions 22—23 and rear lateral portion 24, is rigidly coupled to the vertical portions of the arched axle 11. The forward ends of the frame members 19 and 20 are connected by clips 25 and 26 to the vertical portions of the axle 10, while the forward ends of the frame members 22 and 23 are connected by clips 27 and 28 to the vertical portions of the axle 11.

The draft tongue is represented as a whole at 29, and attached as by bolts 30—31 to the rear portion of the tongue are bars 32—33, and connected at 34—35—36 and 37 to the bars at their ends are short bars 38—39 in spaced parallel relation to the tongue, the members 38 and 39 being further supported by obliquely directed braces 40 and 41.

At its rear end the member 38 is coupled to the frame members 22—23 by an inverted substantially U-shaped standard 43, while a similar standard 42 couples the member 39 to the frame members 19—20.

Obliquely directed braces 44 and 45 are respectively connected at their ends to the members 19 and 20 and 39, while like braces 46 and 47 are connected at their ends to the members 22 and 23 and the member 38. One of the bolts or rivets of each of the clips 25—26—27 and 28 will preferably be utilized to attach the standards 42 and 43 and the braces 44—45—46 and 47, to the members 19—20 and 22—23.

By this arrangement the tongue frame and the axle frames are rigidly united.

Attached to the transverse portions 21 and 24 of the frames are bracket devices and as they are precisely alike the description of one will suffice for both.

Each of the brackets comprises a vertical body 48 having means for attachment respectively to the portions 21 and 24 of the frames, and each also including a vertical socket 49 and spaced reinforcing webs 50—51, the latter having a downwardly opening seat 52.

A shaft or standard each including a vertical portion 53, is rotative in the socket 49, and a rearwardly directed oblique portion 54 terminating in a bracket 55 including a bearing 56 in which stub axles 57 are rotatively mounted, the latter each carrying twin trailer wheels 57'.

Attached to the oblique portions 54 of each of the trailer wheel standards is a two part bracket device 59 and 60, having rearward extensions 59' and 60' bolted or otherwise connected at 61. The portion 60' of the bracket is provided with upstanding ears 62 in which a roller 63 is mounted and bearing when the standard extends directly rearwardly, in the seat 52 of the bracket 48. The bracket device 59 is rigidly clipped to the oblique portion 54 of the standard and moves therewith both swingingly and vertically.

The vertical portions 53 of the standards extend above the portions 50 of the brackets, and slidably disposed upon these extended portions is a bridge member 64 to which the seat standard 64' is connected and carrying the seat 65.

A spring 66 surrounds each of the vertical portions 53 of the standards between the bridge member 64 and the portion 50 of the bracket, and operates to mutually support the standards and trailer wheels relative to the supporting frames.

The plow beams are represented respectively at 67, and each are coupled adjustably to a member 68 to which a double mold board 69 is attached, as shown. Attached at 70 to each of the members 68 is a clip device 71, each clip device having a bracket device 73 pivoted thereto at 72. Each of the devices 73 includes a bearing 74 to receive a standard 75 adapted to be adjustably supported in the bearings by a set screw 76. At its lower end the standard 75 is provided respectively with a bearing 77 to support a stub shaft 78, the latter carrying an obliquely disposed dish shaped coverer disk 79.

Each of the plow beams 67 has secured to one side thereof a plate 90 having the downwardly extending ear 91, as shown in Figures 11 and 13. Connected to and extending from these ears 91 is a link member 96 mounted upon and secured to revolve with the shaft 92 which extends transversely of each of the U-shaped frames. The inner end of each of these shafts has extending therefrom a control lever 93 by means of which the shaft may be oscillated. Connected to each of the link members 96 and extending rearwardly therefrom, is a spring 97 which is attached at its rear end to the standard 97' and acts to hold the plow beam 69 in contact with the earth at all times. The shaft 92 is mounted in bearings 91 which are secured to the side beams 19—20 and 22—23 respectively, of the U-shaped frames.

Extending upwardly from each of the plow beams 67 is a pair of supporting standards 99 which support the seed pan structure 85 and the drive mechanism or chains 87 connected therewith. A supporting arm 100, having one end connected to the seed pan structure 85 carries upon its other end a sprocket wheel 101 over which the chains 87 pass and a second arm 102 extends from and assists in the support of the sprocket wheels 101, to the frame axle where it is mounted to oscillate thereon.

It will be seen that upon moving the lever 93 forwardly for instance, the shaft 92 will be revolved and the link members 96 swung forwardly and downwardly the plow beam and seed pan structure and associated parts will be swung forwardly at the same time thus lifting the plow 69 from the ground. The spring 97 acts to maintain positive contact between the plow 69 and the ground, when the lever 93 is drawn backwardly.

At their forward ends the plow beams 67 are provided with clevis devices 80, and coupled to the clevises by link devices 81 is a draft beam 82, and coupled to the draft beam by a link device 83 is an evener beam 84, the latter designed to support the draft appliances, not shown.

The seed cans are represented conventionally at 85, the seed dropper mechanism at 86 operative by chains 87 from the axles, and the seed spouts at 88, of the usual construction.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed is:

1. In an implement of the character set forth, an inverted substantially U-shaped member having the ends of the sides thereof turned at right angles outwardly in alignment and constituting axles, a wheel on each axle, a second inverted substantially U-shaped member having the end of one leg turned outwardly to provide an axle, a wheel on said axle, a bearing upon the end of the other leg and in alignment with said last mentioned axle, a stub axle carried in said bearing, a universal connection between said stub axle and an axle of said first mentioned member, frame elements extending rearwardly from said members, trailer caster wheels carried by said frame elements, and a plow unit secured to and depending from each frame element and extending forwardly through the adjacent U-shaped member.

2. In an implement of the character set forth, a pair of inverted substantially U-shaped members arranged in edge to edge relation and having a connected portion between the ends of the adjacent legs, the outer leg of each member being turned outwardly to provide an axle, a wheel upon each axle and upon said connection portion, a rearwardly extending frame carried by each U-member, wheel means for supporting the outer ends of said frame, a plow carrying beam mounted in each frame and extending forwardly through the adjacent U-shaped member, and pivotally mounted means having link connection with said beam for swinging the same and the attached plow structure.

3. In an implement of the character set forth, a pair of inverted substantially U-shaped members arranged in edge to edge relation and having a connecting portion between the ends of two adjacent legs, the outer leg of each member being turned outwardly to provide an axle, a wheel upon each axle and upon said connection portion, a rearwardly extending frame carried by each U-shaped member, wheel means for supporting the outer ends of said frame, a plow carrying beam mounted in each frame and extending forwardly through the adjacent U-shaped member, soil treating tools mounted on said plow beam, and pivotally mounted means having link connection with said beam for swinging the same and the attached plow and seed depositing structure.

In testimony whereof, I affix my signature hereto.

TURNEY B. ROBERTS.